US011608000B2

(12) United States Patent
Moen

(10) Patent No.: US 11,608,000 B2
(45) Date of Patent: Mar. 21, 2023

(54) AGRICULTURAL PRODUCT DELIVERY APPLICATOR WITH A PLURALITY OF MOVABLE RAILS

(71) Applicant: CNH Industrial America LLC, New Holland, PA (US)

(72) Inventor: Richard Moen, Glenwood, MN (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 565 days.

(21) Appl. No.: 16/715,642

(22) Filed: Dec. 16, 2019

(65) Prior Publication Data
US 2021/0178973 A1 Jun. 17, 2021

(51) Int. Cl.
| | |
|---|---|
| *E04G 5/14* | (2006.01) |
| *B60R 3/00* | (2006.01) |
| *B60R 3/02* | (2006.01) |
| *A01D 41/12* | (2006.01) |
| *B60P 3/22* | (2006.01) |
| *B60P 1/60* | (2006.01) |

(52) U.S. Cl.
CPC .......... *B60R 3/005* (2013.01); *A01D 41/1217* (2013.01); *B60P 1/60* (2013.01); *B60P 3/228* (2013.01); *B60P 3/2245* (2013.01); *B60R 3/02* (2013.01)

(58) Field of Classification Search
CPC ......... B60R 3/005; B60R 3/02; B60R 3/2245; B60R 3/228; E04G 5/14; E04G 21/3228; B60P 1/60; B60P 3/2245; B60P 3/228; A01D 41/1217

USPC .......................................... 280/163; 182/113
See application file for complete search history.

(56) References Cited

U.S. PATENT DOCUMENTS

| | | | |
|---|---|---|---|
| 4,216,988 A | 8/1980 | Weiss | |
| 4,613,155 A * | 9/1986 | Greenwood | A01D 41/1261 105/457 |
| 4,796,945 A | 1/1989 | Congdon | |
| 4,869,343 A * | 9/1989 | Anderson | E04G 5/14 182/113 |

(Continued)

FOREIGN PATENT DOCUMENTS

| | | | |
|---|---|---|---|
| EP | 0470005 A1 | 2/1992 | |
| EP | 3281826 A1 * | 2/2018 | ............. B60R 3/005 |

(Continued)

OTHER PUBLICATIONS

Safety Handrail System for Trucks and Tank Trailers—https://trucktanks.com/handrail-safety-system-truck-trailer/—(Mar. 23, 2016).

(Continued)

*Primary Examiner* — Hilary L Gutman
(74) *Attorney, Agent, or Firm* — Rebecca Henkel; Rickard DeMille

(57) ABSTRACT

An agricultural product delivery applicator for delivering particulate product to a field. The applicator comprises a bin to hold the product, a pneumatic conveying system to provide an airflow, a metering system operably connected between the supply compartment and the pneumatic conveying system, and a rail system. The metering system meters product with the airflow to result in a mixed flow of airflow and product. The rail system includes first and second foldable rails.

18 Claims, 6 Drawing Sheets

(56) References Cited

U.S. PATENT DOCUMENTS

| | | | |
|---|---|---|---|
| 5,213,367 A * | 5/1993 | Norman, Jr. | B60P 3/224 |
| | | | 182/127 |
| 6,003,633 A * | 12/1999 | Rolson | E06C 5/02 |
| | | | 182/127 |
| 6,045,157 A | 4/2000 | Poulin | |
| 7,472,663 B1 | 1/2009 | Horn | |
| 7,578,247 B2 | 8/2009 | Horn | |
| 8,033,482 B2 | 10/2011 | Honermann | |
| 8,632,099 B2 | 1/2014 | Conny et al. | |
| 8,689,938 B2 * | 4/2014 | Kenton | E04H 17/18 |
| | | | 182/113 |
| 9,403,486 B2 | 8/2016 | May | |
| 9,688,493 B2 | 6/2017 | Leum | |
| 10,293,755 B2 | 5/2019 | Brett et al. | |
| 10,322,658 B2 | 6/2019 | Borkgren et al. | |
| 2004/0017281 A1 | 1/2004 | Dix | |
| 2006/0054393 A1 * | 3/2006 | Eisenkrein | E04G 21/3233 |
| | | | 182/113 |
| 2006/0120836 A1 | 6/2006 | Cresswell et al. | |
| 2011/0253478 A1 * | 10/2011 | Anderson | E06C 7/182 |
| | | | 182/106 |
| 2014/0174851 A1 * | 6/2014 | Kennedy | B60R 3/02 |
| | | | 182/83 |
| 2015/0060202 A1 | 3/2015 | Fanello | |
| 2015/0291100 A1 * | 10/2015 | Koshy | E04H 12/2269 |
| | | | 280/727 |
| 2016/0095276 A1 | 4/2016 | Roberge et al. | |
| 2016/0201293 A1 * | 7/2016 | Roth | E02F 9/0891 |
| | | | 296/190.01 |
| 2017/0073155 A1 * | 3/2017 | Borkgren | B65D 25/28 |
| 2017/0313255 A1 * | 11/2017 | Brett | E04G 5/14 |
| 2018/0044985 A1 | 2/2018 | Orscheln | B60R 3/02 |
| 2018/0162279 A1 * | 6/2018 | Eicher | B60R 3/005 |
| 2018/0343792 A1 | 12/2018 | Roberge et al. | |
| 2019/0021215 A1 | 1/2019 | Roberge et al. | |
| 2019/0023504 A1 | 1/2019 | Roberge et al. | |
| 2019/0061629 A1 * | 2/2019 | Gemme | E06C 7/182 |
| 2021/0024004 A1 * | 1/2021 | Crowley | A01B 76/00 |

FOREIGN PATENT DOCUMENTS

| | | | | |
|---|---|---|---|---|
| FR | 2063453 A5 * | 7/1971 | | |
| FR | 3014126 A1 * | 6/2015 | | E04G 21/3228 |
| FR | 3022934 A1 * | 1/2016 | | E04F 11/1865 |
| FR | 3045086 A1 * | 6/2017 | | |

OTHER PUBLICATIONS

Brillion Till 'N Seed—http://www.landoll.com/wp-content/uploads/2018/04/Till_N_Seed_TNS_Z_0217.pdf—(Oct. 11, 2019).

* cited by examiner

AGRICULTURAL PRODUCT DELIVERY APPLICATOR WITH A PLURALITY OF MOVABLE RAILS

FIELD OF THE INVENTION

The invention relates generally to an agricultural product delivery system for applying particulate material such as seed, fertilizer, herbicide, or insecticide to a field, and more particularly an agricultural product delivery applicator with a plurality of movable rails for providing operator assistance when moving around on the applicator.

BACKGROUND OF THE INVENTION

Agricultural product delivery applicators (or systems) are known to utilize various mechanisms, including mechanical and pneumatic systems, to assist in the movement and delivery of particulate material or product. Example product that can be delivered include fertilizer, seed, insecticide, or herbicide. The product can move from a product bin through an interior passage provided by a series of elongate tubes, which extend from the product supply chamber to a product applicator. The applicator places the product on or in growing medium, such as soil. Such agricultural product delivery systems are commonly employed in planters, air drills, fertilizer and pesticide applicators, and a variety of other agricultural implements.

Agricultural product delivery applicators are known to have a product supply bin with a plurality of chambers. The product is typically loaded into one or more of chambers through a screen or grate at the top of the bin. Other chambers may utilize a moveable cover. It is common for an operator to stand on top of the screen or cover while assisting or directing the product into the bin. Some known prior applicators include a railing or handrail for assisting the operator when the operator works on top of the bin. An example folding handrail is disclosed in U.S. Pat. No. 10,293,755, the content of which is incorporated herein by reference. An improved railing system over known prior railings is desired.

BRIEF SUMMARY OF THE INVENTION

In one aspect, the invention provides an agricultural product delivery applicator for delivering particulate product to a field. The applicator comprises a bin to hold the product, a pneumatic conveying system to provide an airflow, a metering system operably connected between the supply compartment and the pneumatic conveying system, and a rail system. The metering system meters product with the airflow to result in a mixed flow of airflow and product. The bin includes a front, a back opposite the front, a first side between the front and back, and a second side between the front and back. The first side has a first length and the second side has a second length. The rail system includes a first foldable rail assembly comprising a first foldable rail rotatable between a first, down position and a first, up position, and a hinge portion fastening the foldable rail to the first side. The first foldable rail has a first railing with a third length. The third length is less than fifty percent of the first length. The rail system includes a second foldable rail assembly comprising a second foldable rail rotatable between a second, down position and a second, up position, and a hinge portion fastening the foldable rail to the second side. The second foldable rail has a second railing with a fourth length. The fourth length is greater than fifty percent of the first length.

In another aspect, the invention provides the first length and second length being the same, the third length is less than forty percent or even thirty of the first length.

In another aspect of the invention, the second rail is substantially equidistant between the front and the back of the bin, and the first rail is substantially towards the front of the bin.

In yet another aspect of the invention, the first rail does not overlap the second rail along the length of the first and second sides.

In another aspect of the invention, the applicator further comprises a ladder coupled to the front of the bin. The ladder being coupled closer to the first side and further from the second side. The ladder can include a first extension rail and a second extension rail.

Numerous additional objects, aspects, and advantages of the present invention will be made apparent from the following detailed description taken together with the drawing figures.

BRIEF DESCRIPTION OF THE DRAWINGS

Preferred exemplary embodiments of the invention are illustrated in the accompanying drawings in which like reference numerals represent like parts throughout. In the drawings.

DETAILED DESCRIPTION OF THE INVENTION

Figure 1:
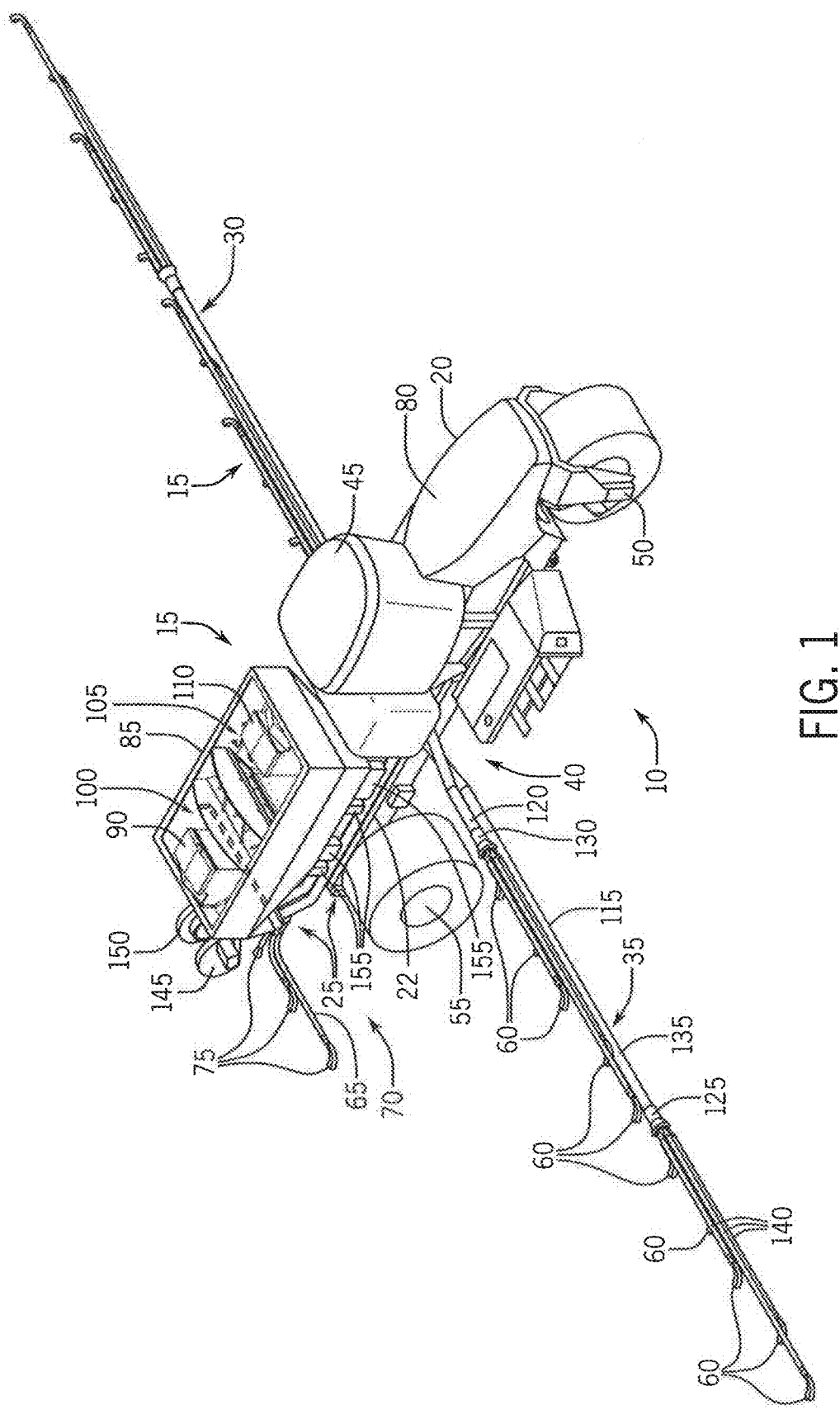
FIG. 1 is an isometric view of an agricultural application implement having a pneumatic conveying system according to one exemplary embodiment of the invention.

An agricultural application implement 10 (or simply implement 10) incorporating aspects of the invention is shown in FIG. 1. In the exemplary embodiment shown, the implement 10 includes an agricultural product delivery applicator 15 (or simply applicator 15), which is shown as a granular fertilizer applicator. As is known in the art, the implement 10 generally includes a transport unit 20, such as a truck, tractor, or trailer. The applicator 15 can be formed integrally with or separately from the transport unit 20. The applicator 15 includes a pneumatic conveying system 25 (or simply system 25).

The applicator 15 includes left and right laterally extending booms 30 and 35, respectively, extending at a mid-implement location 40. Left and right are referred to herein as viewed by the operator housed in the operator cab 45. The mid-implement location 40 refers to a mounting of the booms 30 and 35 between the front and rear axles 50 and 55, respectively, of the transport unit 20. The laterally extending booms 30 and 35 include a support structure (not shown in FIG. 1 for simplicity) and can be pivoted to a stowed position close to the implement 10 for storage or transport. Each boom 30 and 35 includes a plurality of boom conduits or tubes terminating at respective outboard ends in the applicator 15. The outboard ends of the booms 30 and 35 include a spreading outlet or nozzle. In the exemplary embodiment shown, boom 35 includes outlets 60.

The pneumatic conveying system 25 also includes a laterally extending offset boom 65. The offset boom 65, which may also be referred to as a secondary boom, is mounted at a rearward location 70. The rearward location 70 refers to a mount of the offset boom 65 behind the rear axis 55. The offset boom includes rear outlets 75. The offset boom 65 in combination with the booms 30 and 35 provide complete coverage across the width of applicator 15.

The shown transport unit 20 is self-propelled by an engine in an engine compartment 80 and includes the operator cab 45. For FIG. 1, a bin 85 includes compartments 90, 100, 105, and 110 for carrying particulate material to be distributed to and disbursed by the outlets 60 and 75. One or more of the compartments, e.g., compartment 90 and 110, can be provided to supply micro-nutrients or other materials. The supply of particulate material in compartments 90-110 can be replenished periodically.

Before proceeding, some aspects of the applicator 15 can be a matter of design choice to someone skilled in the art. For example, the number, arrangement, and design of the compartments and outlets can vary. The applicator 15 is illustrative of the types of equipment on which the pneumatic conveying system 25 can be used; however, it should be understood that the pneumatic conveying system 25 may, of course, be employed in conjunction with other agricultural equipment such as tillage, seeding, or planting devices and is useful in distributing particulate material other than fertilizer.

The shown construction of FIG. 1 includes compartments 90-110 of the bin 85 being disposed above portions of the pneumatic conveying system 25. The system 25 includes delivery lines (lines 115 and 120 are labelled) that extend from a plenum at one end, and terminate at the outlets 60 and 75 at the other end. Through the delivery lines, the fluid and the product are transported therein and are to be split by a distributor assembly (assemblies 125 and 130 are labelled). The distributor assembly 125 or 130 divides or distributes a fluid-particulate combination from a supply line (e.g., supply line 135) into a number of smaller distribution lines (e.g., distribution lines 140) that are connected to the outlets 60 and 75.

To collect and drive the particulate material along the delivery lines are one or more pressurized air flow sources. For the shown construction, blowers 145 and 150 are operably connected to the plenums. The air flow from the blowers 145 and 150 is directed from the blowers 145 and 150 into the plenums, then the supply lines, through the distributor assemblies, into the distribution lines, and out the outlets. As the airflow passes through the supply lines, a metering system 155 entrains product from the compartments 90-110 into the airflow. The airflow and entrained product continues to flow along the delivery lines to the outlets 60 and 75.

Figure 2:
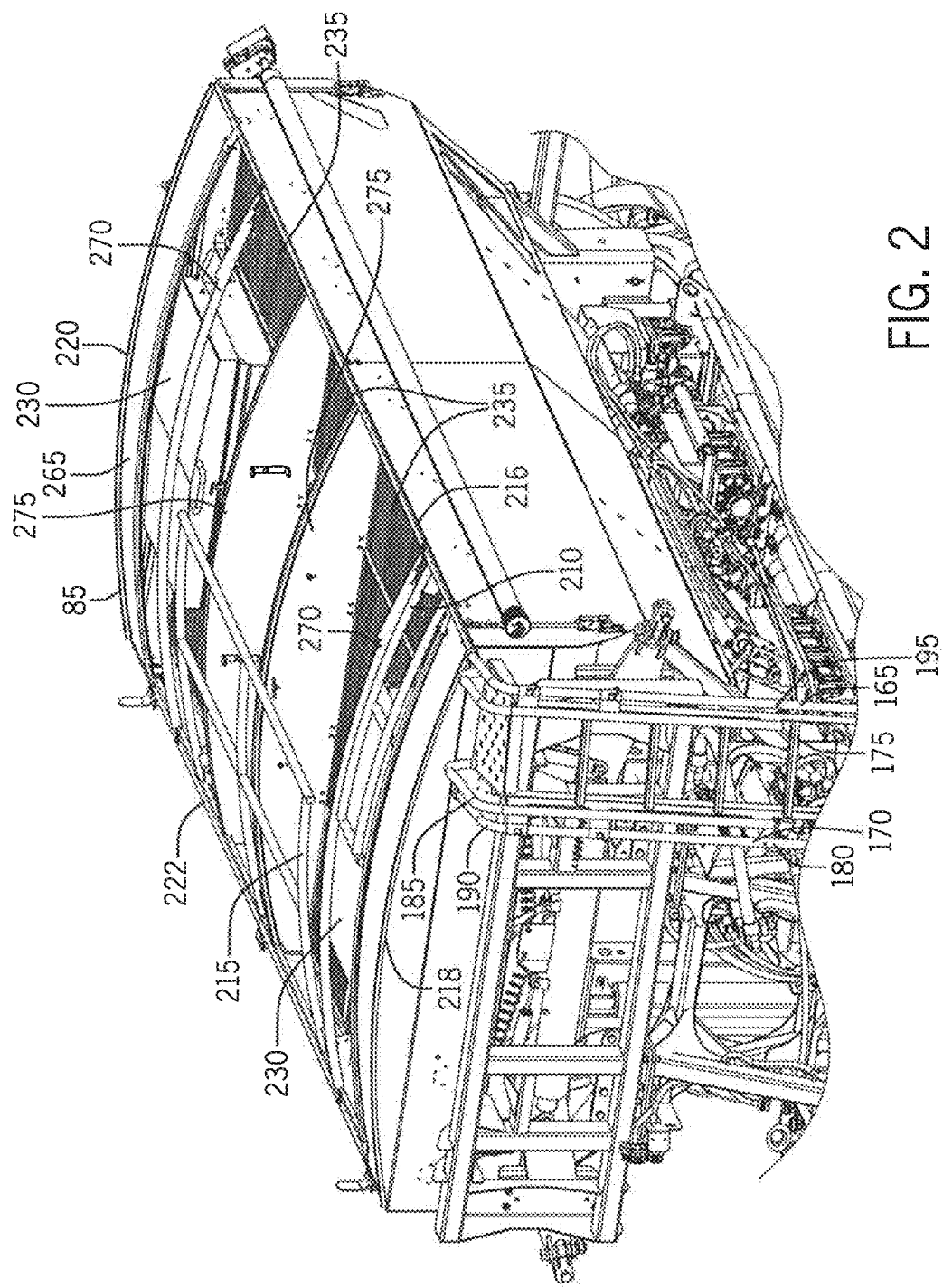
FIG. 2 is a more detailed isometric view of a portion of the implement of FIG. 1 with a plurality of movable rails in a first position.
Figure 3:
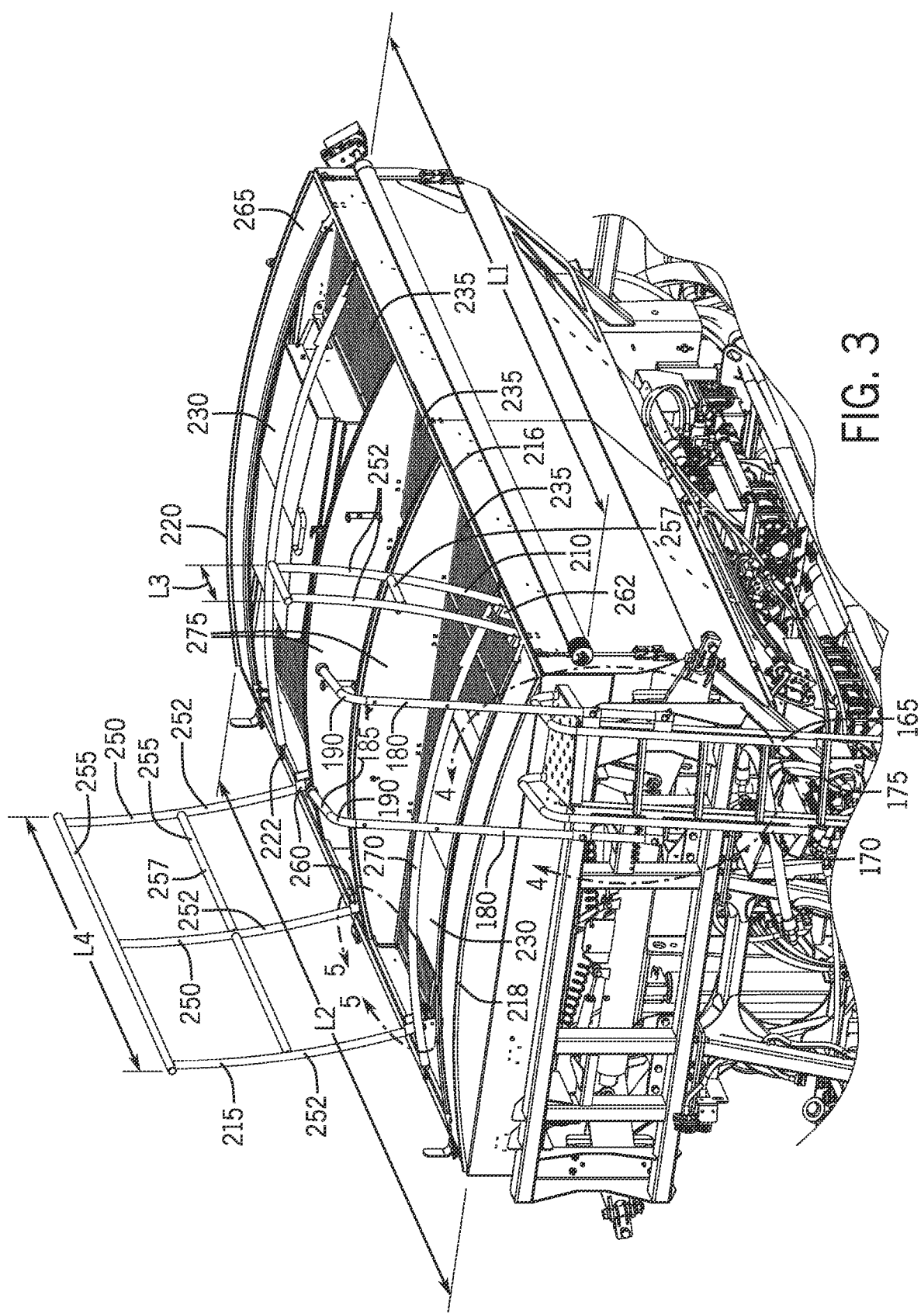
FIG. 3 is a more detailed isometric view of a portion of the implement of FIG. 1 with a plurality of movable rails in a second position.

Referring now to FIGS. 2 and 3, a rail system 160 includes a plurality of movable rails (referenced below), each of which are in a first, or down, position in FIG. 2 and are in a second, or up, position in FIG. 3. Depending on the type of movable rail, the down position may be a lowered position or a folded position, and the up position may be a raised position or unfolded position.

The plurality of movable rails, includes first and second extendable rails 165 and 170 supported by a ladder 175. The first and second extendable rails 165 and 170 are shown as distinct rails, but is envisioned that the first and second extendable rails 165 and 170 can be interconnected together. The ladder 175 allows an operator to climb to the top of the bin 85. The first and second extendable rails 165 and 170 include a respective vertical portion 180 and a respective horizontal portion 185. A vertical portion 180 can be interconnected with a horizontal portion 185 by a bend portion 190. Each of the portions 180-190 can be made of a metal pipe fastened together (e.g., by welding).

Figure 4:
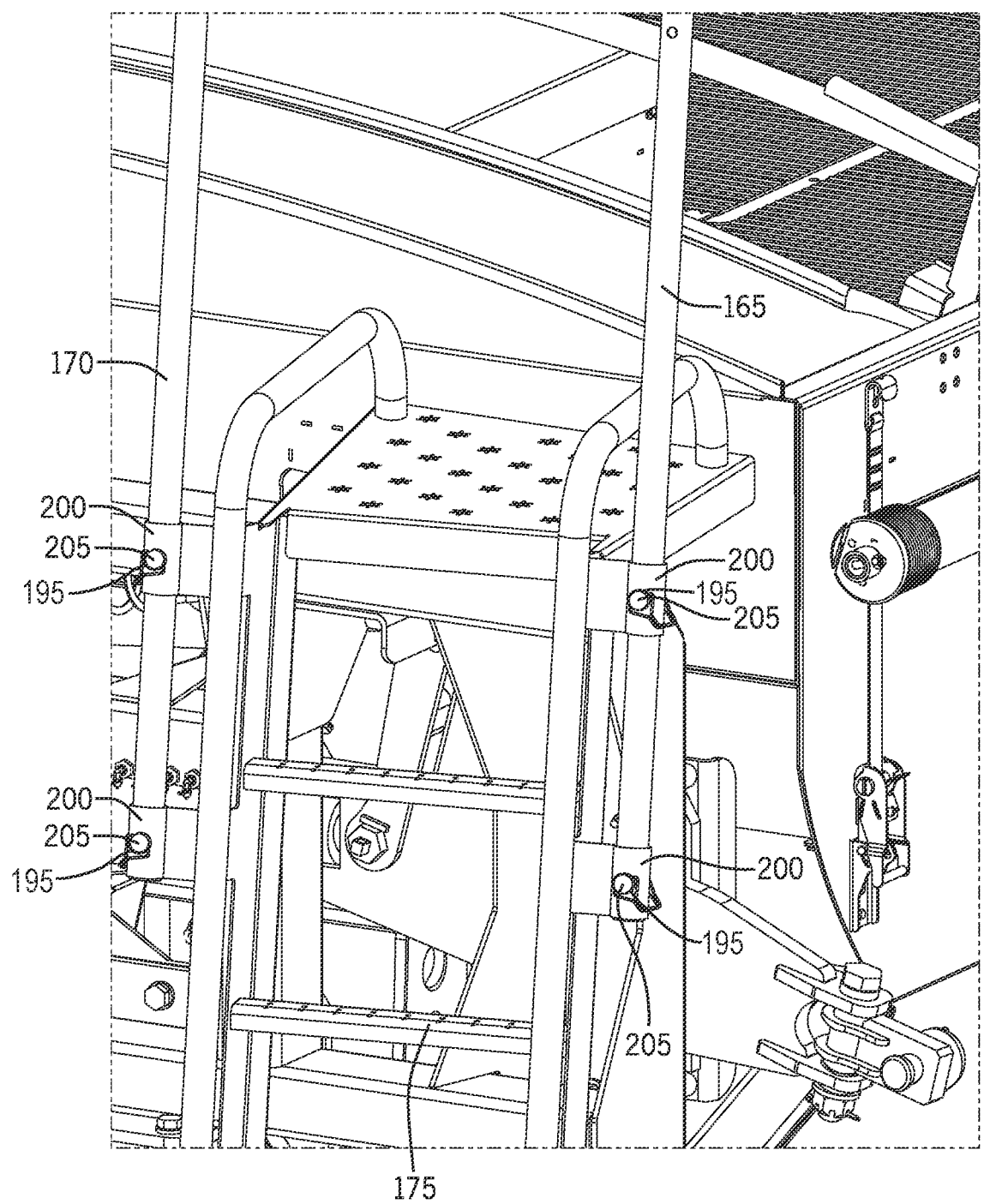
FIG. 4 is an enlarged isometric view along line 4-4 in FIG. 3.

The vertical portions 180 include a series of holes 195. As best shown in FIG. 4, the extendable rails 165 and 170 can move up and down within guides 200. The holes 195 receive fasteners (e.g., bolts 205 or pins), which help to hold the extendable rails 165 and 170 in place. The bolts 205 can be removed to allow the extendable rails 165 and 170 to be raised/lowered into the first or second positions (FIGS. 2 and 3). Raising the extendable rails 165 and 170 allows for additional hand rails for the operator as the operator climbs the ladder 175. Lowering the extendable rails 165 and 170 helps protect the extendable rails 165 and 170 from damage when the implement 10 is moving.

With reference again to FIGS. 2 and 3, the plurality of movable rails, includes first and second foldable rails 210 and 215. The first foldable rail 210 extends from a position on the side 216 of the bin 85 closest to the ladder 175. More specifically, the bin has a front 218, a back 220, a first side 216 connecting the front 218 to the back 220, and a second side connecting the front to back. With the first foldable rail 210 being close to the ladder 175, the rail 210 can act as a handrail and barrier near the position the operator steps from the ladder 175 to the top of the bin 85.

The second foldable rail 215 extends from a position on the side 222 of the bin 85 further away from the ladder 175. Commonly, product is placed in the bin 85 from a chute passing over one side of the bin 85. Placing the second foldable rail 215 on the opposite side 222 of the side 216 the first foldable rail 216 is placed provides a hand rail and barrier for the operator when the operator is on top of the bin 85, but is not in the way of product being deposited into the bin 85 by the chute. Raising the foldable rails 210 and 215 allows for additional hand rails and barriers for the operator as the operator moves around the top of the bin 85. Lowering the foldable rails 210 and 215 helps protects the foldable rails 210 and 215 from damage when the implement 10 is moving. The foldable rails 210 and 215 can also be used to hold a bin cover (referenced below) in place.

With reference to FIG. 3, the side 216 has a first length L1, the side 222 has a second length L2, the first foldable rail 210 has a railing with a length L3, and the second foldable rail 215 has a railing with a length L4. Typically, lengths L1 and L2 are the same and lengths L3 and L4 are different. In various constructions, the length of L3 is less than fifty percent of L1, the length of L3 is less than forty percent of L1, and the length of L3 is less than thirty percent of L1. In various constructions, the length of L4 is greater than fifty percent of L2, the length of L4 is less than sixty percent of L2, and the length of L4 is greater than seventy percent of L2. In a preferred construction, the lengths L3 and L4 add up to be less than the length of either L1 or L2. Also in the preferred construction, while travelling down the lengths L1/L2, the lengths L3 and L4 do not overlap. Also shown in the construction of FIG. 3, the second foldable rail 215 is substantially equidistant between the front 218 and the back 220 of the bin, while the first foldable rail 210 is substantially toward the front 218 of the bin and near the ladder 175.

Figure 5:
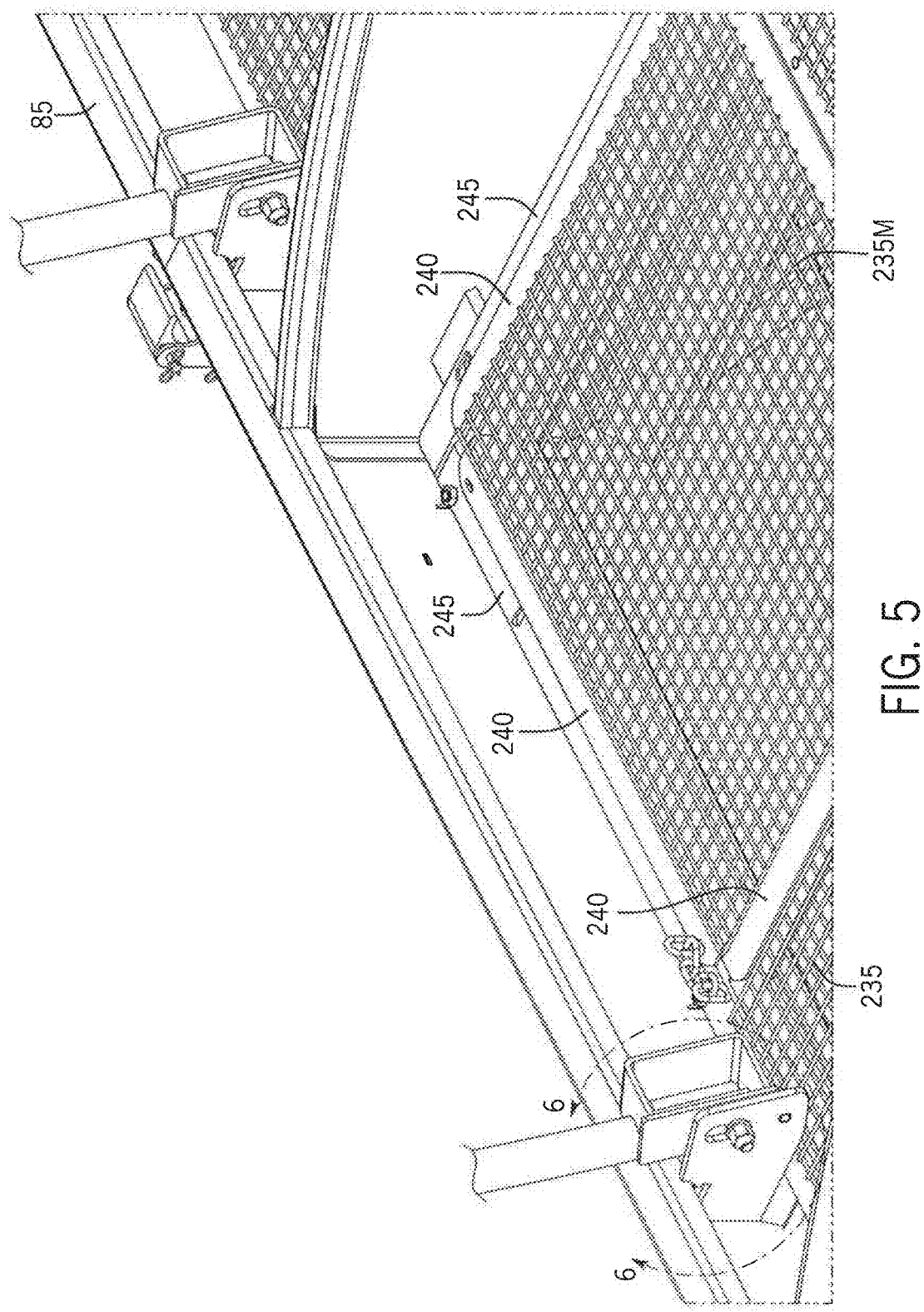
FIG. 5 is an enlarged isometric view along line 5-5 in FIG. 3.

The operator is free to walk around the top of the bin 85 by walking on chamber covers 230 and/or chamber grates 235. FIG. 5 shows an enlarged isometric view of a movable grate 235M. The movable grate 235M includes tabs 240 that contact shelves 245 of the bin 85. The operator can raise and lower the grate movable 235M to allow direct access into the bin 85. Alternatively, the grate 235 can be directly placed on the shelves 245.

For the shown construction, the foldable rails 210 and 215 include vertical-arcuate portions 250, horizontal portions 255, and hinge portions 260. For the first foldable rail 210, the rail 210 includes two hinges 262 and two vertical members 252. For the second foldable rail 215, the rail 215 includes three hinges 260 and three vertical members 252. Each of the portions 250 and 255 can be made a pipe. The vertical portions 250 can be interconnected with the horizontal members 257 by a fixture or welding.

An expandable cover 265 and related supports 270 can be attached to the bin 85. The cover 265 can be a rolled tarp, that when unrolled, protects the product (e.g., from rain). The supports 270 are arcuate in shape and result in the cover 265 being contoured when unrolled. The bin 85 can include walls or dividers 275 to further help support the cover 265. The arcuate shape of the foldable rails 210 and 215 also allow the rails 210 and 215 to support the cover 265 when unrolled. When folded, the folded rail 215 can rest on the dividers 275 and the folded rail 210 can rest on one of a first cover 230.

Figure 6:
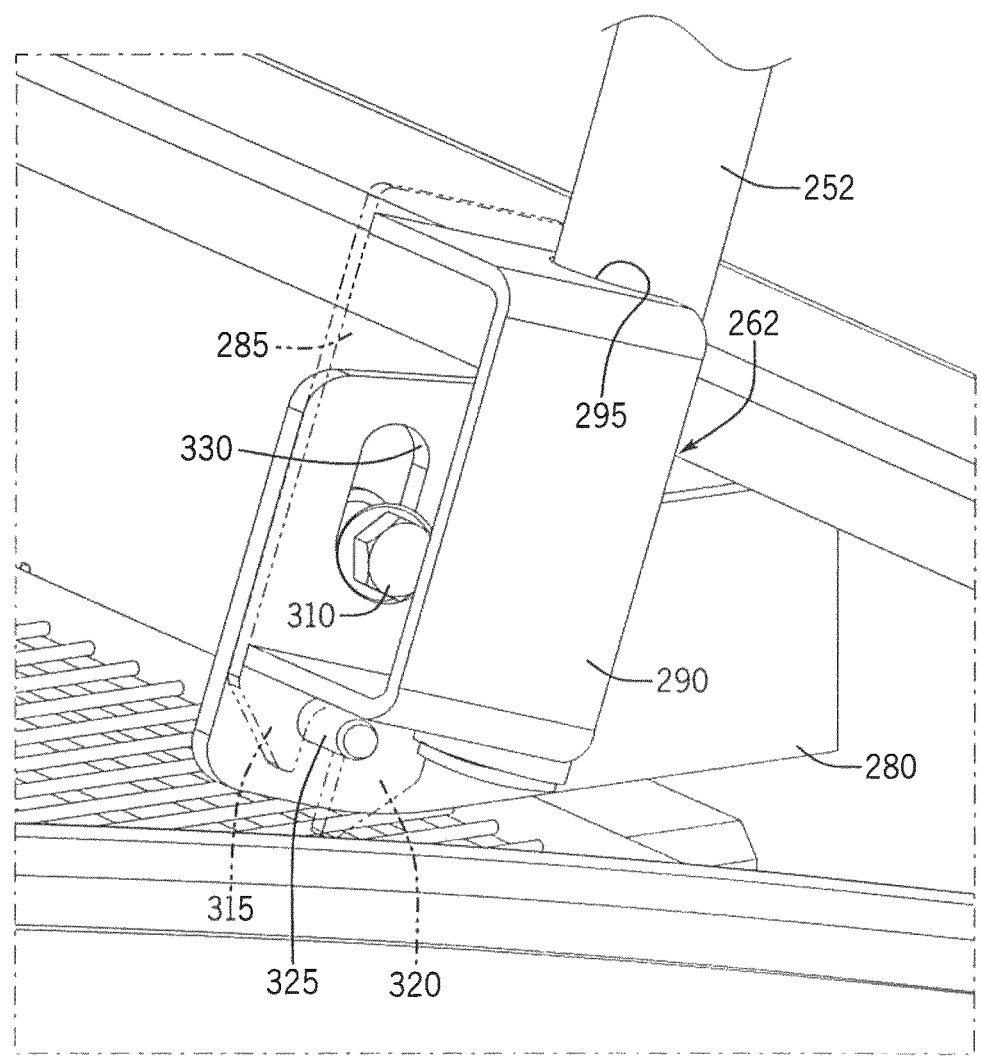
FIG. 6 is an enlarged isometric view along line 6-6 in FIG. 3

FIG. 6 show the hinge 262 in more detail. The hinge portion 262 includes an elbow member 280, a claw member 285, and a retaining member 290. The retaining member 290 includes apertures 295 for receiving a vertical member 252 of the vertical arcuate portion 250. The vertical member 252 can be welded to the retaining member 290 to hold the vertical member 252 in place.

The claw member 285 includes an aperture (not shown) to receive a fastener (e.g., a bolt 310), and fingers 315 and 320. The fingers 315 and 320 allow a fastener (e.g., a pin 325) to readily leave/enter the claw member 285 as an operator raises/lowers a foldable rail 210 or 215. The claw member 285 is fastened (e.g., welded) to the retaining member 290.

The elbow member 280 includes an elongated aperture 330 for the bolt 310 to move within as the foldable rail 210 or 215 is being raised or folded. The pin 325 is fixed to or with the elbow member 280. When moving from the second position (FIG. 3), the bolt 310 moves up the elongated aperture 330 and the pin 325 moves out from between the fingers 315 and 320. The foldable rail 210 or 215 is free then to rotate and fold to the first position (FIG. 2). To raise the foldable rail 210 or 215, the operator rotates the rail 210 or 215 and slides the pin 325 between the fingers 315 and 320.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

What is claimed is:

1. An agricultural product delivery applicator for delivering particulate product to a field, the applicator comprising:
   a bin to hold the product, the bin including a front, a back opposite the front, a first side between the front and back, a second side between the front and back, and at least one divider, the first side having a first length and the second side having a second length;
   a pneumatic conveying system to provide an airflow;
   a metering system operably connected between the bin and the pneumatic conveying system, the metering system to meter the product with the airflow to result in a mixed flow of airflow and the product; and
   a rail system comprising
      a first foldable rail assembly comprising a first foldable rail and a first hinge portion fastening the first foldable rail to the first side such that the first foldable rail is rotatable between a first, down position and a first, up position, the first foldable rail having a first railing with a third length and at least one first vertical member, the at least one first vertical member extending upwardly from the first side of the bin when in the first, up position and extending across a top of the bin, from the first side of the bin towards the second side of the bin, when in the first, down position; and
      a second foldable rail assembly comprising a second foldable rail and a second hinge portion fastening the second foldable rail to the second side such that the second foldable rail is rotatable between a second, down position and a second, up position, the second foldable rail having a second railing with a fourth length and at least one second vertical member, the at least one second vertical member extending upwardly from the second side of the bin when in the second, up position and extending across the top of the bin, from the second side of the bin towards the first side of the bin, when in the second, down position, the second foldable rail resting on one or more of the at least one divider when in the second, down position.

2. The applicator of claim 1, wherein the first length and the second length are equal.

3. The applicator of claim 1, wherein the third length is less than forty percent of the first length.

4. The applicator of claim 1, wherein the third length is less than thirty percent of the first length.

5. The applicator of claim 1, wherein the second foldable rail is substantially equidistant between the front and the back of the bin.

6. The applicator of claim 1, wherein the first foldable rail is substantially towards the front of the bin.

7. The applicator of claim 1, wherein the first foldable rail does not overlap the second foldable rail along the first length of the first side and the second length of the second side.

8. The applicator of claim 1, and further comprising:
   a ladder coupled to the front of the bin, the ladder being coupled closer to the first side and further from the second side.

9. The applicator of claim 8, wherein the first foldable rail is substantially towards the front of the bin.

10. The applicator of claim 9, wherein the second foldable rail is substantially equidistant between the front and the back of the bin.

11. The applicator of claim 10, wherein the first foldable rail does not overlap the second foldable rail along the first length of the first side and the second length of the second side.

12. The applicator of claim 8, wherein the ladder includes an extension rail.

13. The applicator of claim 12, wherein the ladder includes a second extension rail.

14. The applicator of claim 1, wherein the bin further comprises compartments, each of the compartments defining an opening at the top of the bin, one or more of the compartments having a chamber covering on which an operator may walk, the first foldable rail resting on a first one of the chamber coverings when in the first, down position.

15. The applicator of claim 1, wherein the bin further comprises an expandable cover that is movable between a covered position and an uncovered position, the expandable cover in the covered position extending across and being supported by the dividers, the first foldable rail in the first, down position, and the second foldable rail in the second, down position.

16. The applicator of claim 15, wherein the dividers, the first foldable rail, and the second foldable rail have an arcuate shape such that the expandable cover is arcuate in the covered position.

17. The applicator of claim 1, wherein the third length is less than fifty percent of the first length and the fourth length is greater than fifty percent of the first length.

18. An agricultural product delivery applicator for delivering particulate product to a field, the applicator comprising:
- a bin to hold the product, the bin including a front, a back opposite the front, a first side between the front and back, a second side between the front and back, at least one divider extending from the first side to the second side, and an expandable cover movable between a covered position and an uncovered position, the first side having a first length and the second side having a second length;
- a pneumatic conveying system to provide an airflow;
- a metering system operably connected between the bin and the pneumatic conveying system, the metering system to meter the product with the airflow to result in a mixed flow of airflow and the product; and
- a rail system comprising
    - a first foldable rail assembly comprising a first foldable rail and a first hinge portion fastening the first foldable rail to the first side such that the first foldable rail is rotatable between a first, down position and a first, up position, the first foldable rail having a first railing with a third length and at least one first vertical member, the at least one first vertical member extending upwardly from the first side of the bin when in the first, up position and extending across a top of the bin, from the first side of the bin towards the second side of the bin, when in the first, down position; and
    - a second foldable rail assembly comprising a second foldable rail and a second hinge portion fastening the second foldable rail to the second side such that the second foldable rail is rotatable between a second, down position and a second, up position, the second foldable rail having a second railing with a fourth length and at least one second vertical member, the at least one second vertical member extending upwardly from the second side of the bin when in the second, up position and extending across the top of the bin, from the second side of the bin towards the first side of the bin, when in the second, down position,
  wherein the expandable cover in the covered position extends across and is supported by the at least one divider, the first foldable rail in the first, down position, and the second foldable rail in the second, down position.

\* \* \* \* \*